United States Patent Office

3,224,960
Patented Dec. 21, 1965

3,224,960
HYDROCRACKING PROCESS EMPLOYING A CATALYST COMPOSITE OF SILVER INTIMATELY ASSOCIATED WITH AN ACID-ACTING REFRACTORY OXIDE SUPPORT
William B. Wilson, Pleasant Hill, Calif., assignor to Shell Oil Company, New York, N.Y., a corporation of Delaware
No Drawing. Filed Apr. 30, 1962, Ser. No. 191,287
15 Claims. (Cl. 208—111)

This invention relates to a process for the catalytic conversion of hydrocarbons and an improved catalyst therefor. In particular, the invention is related to the hydrocracking of hydrocarbons with a catalyst comprising silver.

Destructive hydrogenation, more commonly called hydrocracking, by catalytic means is a well known process which has been practiced commercially in Europe before and during World War II. Destructive hydrogenation of hydrocarbon oil, usually a coal tar or a high boiling petroleum fraction, such as gas oils or cycle stocks, generally is carried out at quite high temperatures and pressures on the order of 850° F. and 1500 p.s.i.g. and up. In addition, the hydrocracking process is usually carried out in two or more stages, the first stage being a hydrogenation stage to remove deleterious impurities in the feed, and the second stage being the actual hydrocracking stage. Hydrogenation in the first stage usually is sufficiently severe to assure almost complete removal of nitrogen compounds, i.e., to below about 10 parts per million, and preferably 5 parts per million. Nitrogen compounds are considered to be a poison for most, if not all, hydrocracking catalysts.

More recently, the hydrocracking process has received favorable attention in America. While hydrocracking has inherent advantages over conventional catalytic cracking, such as a lower gas and coke make, it is generally considered as a complementary process to conventional catalytic cracking because gas oils and cycle stocks from the catalytic cracking process are excellent hydrocracking feeds. Activity has generally been centered in the development of highly active and stable catalysts for the conversion process. Early catalysts for the hydrocracking process consisted of a heavy metal component on an activated clay, such as tungsten disulfide on HF activated Terrana clay, or iron on HF activated montmorillonite. After the war, improved catalysts, such as molybdenum or nickel on silica-alumina, were developed. More recently, hydrocracking processes have been described which employ nickel sulfide or cobalt sulfide on silica-alumina or a platinum or palladium group metal deposited on an acidic refractory oxide support such as silica-alumina.

A hydrocracking process has now been found which employs a catalyst comprising silver intimately associated with an acid-acting inorganic refractory oxide. While it is known that silver has catalytic properties, notably for oxidizing ethylene to ethylene oxide, it is a remarkably weak hydrogenation catalyst by itself; and therefore it has been up to now of little, if any, interest for hydrocracking. It has been found, surprisingly, that silver, when intimately associated with an acid-acting inorganic refractory oxide support, such as silica-alumina, exhibits strong catalytic activity for hydrocracking hydrocarbon oils. There are several methods for preparing a supported silver catalyst, activity of the catalyst varying somewhat according to the method of preparation. A common method is to contact silica-alumina, preferably in the form of pellets or extrudates, with a solution of a soluble silver salt such as silver nitrate, the impregnated catalyst then being dried and calcined. Another method is to incorporate a silver compound into a silica-alumina hydrogel as the hydrogel is formed such as, for example, by mixing rapidly a solution of sodium silicate, sodium aluminate and silver nitrate. One difficulty associated with this method is that in washing the hydrogel with, say, ammonium nitrate solution and water to remove sodium ions, a considerable portion of silver is removed as well. A third method is to contact a silica-alumina, preferably as a hydrogel, and especially a hydrogel which is substantially free from sodium ions, with a solution of a silver salt such as silver nitrate wherein the metal is in the form of a cation. Silver ions are thereby ion-exchanged into the silica-alumina.

Silver can be ion-exchanged into the catalyst by conducting the ion-exchange in the presence of ammonium ion. Should an ammoniacal solution of silver nitrate be used to contact the silica-alumina hydrogel, sufficient ammonium hydroxide should be used, e.g., by maintaining a relatively high pH, i.e., on the order of 11 or so, to assure that the silver remains in solution as a silver ammonium complex rather than precipitate as hydrated silver oxide. Another method is to pretreat a silica-alumina hydrogel with ammonium hydroxide solution prior to ion-exchange with the silver solution. For example, a silica-alumina hydrogel, previously washed with ammonium nitrate solution and water to remove sodium ions, is treated with a small amount of concentrated ammonium hydroxide and sufficient water to provide a thick slurry. The treated hydrogel is washed with water to remove excess ammonium hydroxide prior to contact with silver nitrate solution. It is considered that highly active acidic sites of the silica-alumina sorb ammonium ions during the treatment with a strong ammonium hydroxide and thus are protected in some manner during the subsequent contact with silver nitrate solution. Weaker unprotected acid sites presumably become covered by silver or are affected in some manner during the ion-exchange step. Sufficient ammonium hydroxide should be used to cover at least a substantial portion of the acid sites. It is also possible that the strong ammonium hydroxide treatment helps remove residual sodium ions from the hydrogel. Marked improvement in catalyst stability is obtained by ion-exchange of silver into a hydrogel pretreated with ammonium hydroxide.

Activity of a silver ion-exchanged catalyst is markedly superior to a silver catalyst prepared by the other methods. This is attributed to a rather high degree of dispersion of silver throughout the silica-alumina. Moreover, the silver apparently is intimately combined with the silica-alumina to form a silver alumino-silicate, and thus is rather firmly bound within the silica-alumina structure. With a catalyst prepared by impregnation methods the metal salt in the impregnating solution becomes more concentrated as the solvent, such as water, is evaporated. Thus, when all the solvent has been evaporated, the metal compound is deposited in rather large concentrations on the surface of the silica-alumina, either upon the external surface or the surface within the pores of the catalyst. With a co-gelled catalyst it is possible that silver ions are competing with sodium ions in the hydrogel, and thus are not completely incorporated in the hydrogel or are trapped within the hydrogel as it is formed.

The amount of silver incorporated in the catalyst is generally expressed as a percent, calculated on the basis of elemental metal, of the total weight of the catalyst. The amount of silver in the catalyst can vary from about 0.1 to 20% by weight, and preferably is about 2 to about 15% by weight.

While any acid-acting inorganic refractory oxide having the ability to catalyze the splitting of carbon to carbon bonds can be used as a base, the preferred base comprises silica and alumina. The preferred base is predominantly silica and contains from about 50% to about 90% silica with the remainder, i.e., about 50% to 10%, alumina. A particularly preferred silica-alumina catalyst base comprises from about 70% to 90% silica and from about 30% to 10% alumina. If desired, other refractory oxides such as zirconia, titania, boria and the like can be used in the base for the alumina in whole or in part. At times it is advantageous to incorporate fluorine and/or metal promoters into the catalyst. For a catalyst containing fluoride, the amount of fluoride can vary from about 0.1% to about 5% by weight, and preferably is about 1% to about 3% by weight, based on the total weight of the catalyst. In general, a larger amount of fluoride compound is incorporated in the catalyst as the alumina content of the support is increased.

In the hydrocracking process, feed is introduced to the reaction zone as a liquid, vapor or mixed liquid vapor phase, depending on the temperature, pressure and amount of hydrogen mixed with the feed and the boiling range of the feed stock utilized. The hydrocarbon feed, including fresh as well as recycled feed, is introduced into the reaction zone with a large excess of hydrogen, since the hydrocracking process is accompanied by rather high consumption of hydrogen, usually of the order of 500 to 2000 standard cubic feet of hydrogen per barrel of total feed converted. Conversion herein refers to the products obtained which boil below 420° F. Excess hydrogen is generally recovered, at least in part, from the reaction zone effluent and recycled to the reactor together with additional makeup hydrogen. Pure hydrogen is not necessary, as any suitable hydrogen-containing gas which is predominantly hydrogen can be used. Particularly suitable is the hydrogen-rich gas containing on the order of 70% to 90% hydrogen which is obtained from a catalytic reforming process.

Hydrocracking feed is a hydrocarbon distillate, preferably boiling above the boiling range of gasoline, for example, boiling in the range of about 450° to 950° F. It is generally desirabe to subject the hydrocarbon feed to a suitable pretreatment such as a catalytic hydrogenation treatment with a hydrogenation catalyst, e.g., cobalt or nickel and molybdenum on alumina. An advantage of such a hydrogenation treatment is to remove from the feed coke-forming constituents which tend to deposit on the hydrocracking catalyst, and to remove impurities such as nitrogen compounds which act as a hydrocracking suppressor. With most hydrocarbon oils available as a hydrocracking feed, hydrogenation reduces the nitrogen content to less than about 30 p.p.m. w., and preferably less than 10 p.p.m. w.

Operating conditions employed in the hydrocracking conversion include a temperature in the range of about 500° to about 850° F., a hydrogen to oil molar ratio of about 5 to 50, a pressure of about 500 to 3000 p.s.i.g. and a liquid hourly space velocity of about 0.1 to about 10, preferably 0.5 to 5. Under normal conditions, total pressure employed in the hydrocracking zone will be in the range of from about 1000 to 2000 p.s.i.g. For a given partial pressure of hydrogen in the reaction zone, total pressure will depend upon such factors as purity of the hydrogen gas, hydrogen/oil ratio and the like. Too low a partial pressure of hydrogen tends to decrease catalyst life, while too high a partial pressure tends to saturate aromatics which results in excessive hydrogen consumption and loss of octane quality of the gasoline product.

Although the activity of the silver catalyst is maintained for a long period of time, it may be necessary to regenerate the catalyst after long periods of service to extend its useful life. The regeneration can be effected by treatment with air or other oxygen-containing gas in a known manner to burn carbonaceous deposits therefrom. In general, it is preferred to control regeneration temperature so as not to exceed about 1200° F.

The invention is illustrated in more detail in the following examples.

*Example I*

A series of catalysts comprising silver and silica-alumina was prepared and tested in a bench scale hydrocracking unit. Catalyst 1 was prepared by impregnating silver nitrate on pilled synthetic silica-alumina (approx. 13% w. $Al_2O_3$) cracking catalyst treated with 1% Dow Corning silicone oil. The impregnated catalyst was calcined 2 hours at 1020° F.

Catalyst 2 was prepared by mixing solutions of sodium silicate, sodium aluminate, sodium fluoride and silver nitrate in proportions to give approximately 28% w. alumina and 1.5% fluorine in the silica-alumina base. The mixture was brought to a pH of about 7 by the addition of dilute sulfuric acid. The hydrogel which formed was aged for a short period of time, filtered, and washed with ammonium nitrate solution and water to remove sodium ions. After drying, the gel was calcined in air for 2 hours at 1020° F. Surface area of the catalyst was 170 m.$^2$/g.

Catalyst 3 was prepared in the same manner as catalyst 2 with the exception that no sodium fluoride was used in preparation of the silica-alumina base, and therefore the final catalyst contained no fluorine. The surface area of this catalyst was 195 m.$^2$/g.

Catalyst 4 was prepared in the same manner as catalyst 2 except that a smaller quantity of silver was incorporated in the catalyst. Surface area of this catalyst was 225 m.$^2$/g.

Catalyst 5 was prepared by mixing solutions of sodium silicate, sodium aluminate and sodium fluoride in proprotions to give approximately 28% alumina and 1.5% w. fluorine in the gel. The mixture was brought to a pH of about 7 by the addition of dilute sulfuric acid. The hydrogel which formed was aged for a short period of time, filtered and washed with ammonium nitrate solution and water to remove sodium ions. The washed gel was slurried in silver nitrate solution to incorporate silver ions into the hydrogel by ion exchange with ammonium ion. The gel was washed with water, dried, and calcined in air at 1020° F. The final catalyst contained 0.15% sodium, which indicated that removal of sodium ions from the gel was only partially complete. Surface area of the catalyst was 255 m.$^2$/g.

Catalyst 6 was prepared in the same manner as catalyst 5 except that a larger quantity of silver was incorporated in the catalyst. This catalyst had a surface area of 272 m.$^2$/g.

Catalyst 7 was prepared by contacting a commercial sodium alumino silicate, sold under the trade name Decalso by the Permutit Company, with silver nitrate solution to ion exchange silver into the catalyst.

Fixed beds of the above catalysts were employed to hydrocrack hydrogenated catalytically cracked gas oil at 4 LHSV, 644° F. (340° C.), 1500 p.s.i.g. and 10/1 hydrogen to oil molar ratio. Activity and stability were determined for each catalyst preparation. Activity index corresponds to conversion to material below 420° F. at 3 hours' time, whereas stability is the percent retention of activity after a decade of running, e.g., indicated activity at 10 hours as a percent of activity at 1 hour. Two separate hydrogenated catalytically cracked gas oil feeds, designated as A and B, were employed. While each gas oil had been hydrogenated to a total nitrogen content of approximately 2 p.p.m. w., feed B was somewhat slightly higher boiling than feed A, and apparently was somewhat more refractory, as indicated by comparative tests with several hydrocracking catalysts. Hydrocracking results for the various catalysts are given in Table 1.

TABLE 1

|  | 1 | 2 | 3 | 4 | 5 | 6 | 7 |
|---|---|---|---|---|---|---|---|
| Ag, Percent w | 4.1 | 2.0 | 2.1 | 0.7 | 4.1 | 6.1 | 5 |
| Activity Index | 33 | 25 | 25 | 15 | 60 | 65 | 30 |
| Stability Index | 75 | 75 | 65 | 70 | 75 | 80 | 65 |
| Test Duration Vol. oil/vol. cat | 26 | 12 | 24 | 10 | 26 | 28 | 12 |
| Hydrocarbon feed | A | A | A | A | B | B | B |

The above data indicate that the silver catalyst had good activity and stability for hydrocracking heavy oils, and, moreover, the activity is markedly higher for the catalyst wherein silver has been incorporated by ion exchange into a wet silica-alumina hydrogel.

Catalyst 6 above was tested in a similar manner with a hydrogenated catalytically cracked gas oil feed having a nitrogen content of about 25 p.p.m. w. With this higher nitrogen-containing feed, activity and stability of 37 and 60, respectively, were obtained, which illustrates the deleterious effect of nitrogen on the silver hydrocracking catalysts.

*Example II*

A nickel catalyst was prepared by impregnating nickel nitrate on pilled synthetic silica-alumina (approx. 13% w. $Al_2O_3$) cracking catalyst treated with 1% Dow Corning silicone oil. The impregnated catalyst was calcined 2 hours at 1020° F. The amount and concentration of the nickel nitrate solution was sufficient to provide approximately 5% by weight nickel in the catalyst. This catalyst was treated and tested in the bench scale hydrocracking unit with feed A and at the conditions described above for the experiments given in Table 1. Liquid product collected during the period after the first hour and continuing through the fourth hour of the test was analyzed to determine an overall conversion and product distribution. Results are given in Table II, together with results from a similar test with catalyst No. 1 above. For the silver catalyst a liquid product was collected during the period after the first hour continuing through the 6½ hours' time.

TABLE 2

|  | Conv., percent w <420° F. | Percent w. | | | | i./n. | | |
|---|---|---|---|---|---|---|---|---|
|  |  | $C_3$ | $C_4$ | $C_5$ | $C_6$ | $C_4$ | $C_5$ | $C_6$ |
| Ag | 28 | 0.1 | 1.0 | 1.7 | 1.6 | 1.5 | 10.8 | 19.7 |
| Ni | 40 | 0.2 | 1.8 | 3.1 | 2.8 | 1.6 | 6.2 | 9.4 |

*Example III*

A silica-alumina hydrogel was prepared according to the procedure described above for catalyst 5. Approximately 200 grams of the washed hydrogel was mixed with about 4 grams of concentrated ammonium hydroxide (sufficient to cover approximately one third the number of acid sites as determined by butylamine titration of a separate calcined portion of the hydrogel) and sufficient water to form a thick slurry. Following the ammonium hydroxide treatment, the hydrogel was filtered, washed with water to remove excess ammonium hydroxide, and slurried in silver nitrate solution to ion-exchange silver ions into the hydrogel. The hydrogel was allowed to remain in the silver nitrate solution for a period of about 15 hours after which it was filtered, washed with water, dried and calcined at about 1020° F. The catalyst contained approximately 11% w. silver.

The catalyst was tested in the bench scale hydrocracking unit for an extended period of time with hydrogenated catalytically cracked gas oil, feed B of Example I. The operation was conducted at liquid hourly space velocities of 4, 2 and 1, hydrogen/oil ratios of 10/1 and 5/1 and a pressure of 1500 p.s.i.g. Temperature was adjusted as necessary to maintain conversion at approximately 60% w. Stability of the catalyst seemed excellent at the varying operating conditions. After 500 hours' operation, a temperature of only about 660° F. was required at an LHSV of 1 and hydrogen/oil ratio of 5, with temperature demand to maintain conversion being very slight. However, mechanical difficulties were encountered at times during the test and the test was terminated after about 520 hours after a malfunction in an automatic temperature controller permitted catalyst temperature to rise almost to 1100° F., which apparently resulted in damage to the catalyst. Operating conditions and results are given in Table 3 for the time period indicated. Also given in Table 3 are results of a similar run with a catalyst containing 6% w. silver ion-exchanged into an ammonium hydroxide treated silica-alumina hydrogel.

TABLE 3

|  | 11% Ag | 6% Ag |
|---|---|---|
| Conditions: |  |  |
| Period, hours | 221–223 | 360–362 |
| Temperature, ° F | 678 | 653 |
| $H_2$/oil mole ratio | 4.5 | 31 |
| LHSV | 1 | 1 |
| Results: |  |  |
| Conversion, percent w. <420° F | 58 | 66 |
| $H_2$ consumption, s.c.f./bbl | 720 | 840 |
| Yields, percent w.— |  |  |
| Gas <$C_4$ | 1.0 | 1.4 |
| $C_4$ | 4.1 | 5.2 |
| $C_5$ | 4.5 | 4.9 |
| $C_6$ | 3.9 | 3.9 |
| Ratio, i./n.— |  |  |
| $C_4$ | 2 | 3 |
| $C_5$ | 18 | 14 |
| $C_6$ | 20 | 24 |

I claim as my invention:

1. A catalyst suitable for hydrocracking hydrocarbon oils which comprises from about 2% to 15% by weight silver intimately associated with silica-alumina, said catalyst having been formed by contacting silica-alumina hydrogel substantially free from sodium with an aqueous solution of a silver compound wherein the silver is present as a cation, and activated by calcination at an elevated temperature.

2. The catalyst according to claim 1 wherein from about 0.1% to 3% by weight fluorine is incorporated therein.

3. A catalyst suitable for hydrocracking hydrocarbon oils which comprises from about 2% to 15% by weight silver intimately associated with silica-alumina cracking catalyst, prepared by soaking a silica-alumina hydrogel which is substantilly free from sodium ions and which has been treated with ammonium hydroxide, in an aqueous solution of a silver compound wherein the silver is present as a cation, and activated by calcination at an elevated temperature.

4. A method of preparing a supported silver catalyst which comprises preparing a silica-alumina hydrogel substantially free from sodium ions, treating the hydrogel with ammonium hydroxide, washing the treated hydrogel to remove excess ammonium hydroxide, soaking the washed hydrogel in an aqueous solution of a silver compound wherein the silver is present as a cation, washing the soaked hydrogen to remove excess silver solution, drying and calcining the soaked hydrogel.

5. A method of preparing a supported silver catalyst which comprises preparing a silica-alumina hydrogel, washing the hydrogel first with an aqueous solution of a volatile ammonium salt and then with water to remove sodium ions, treating the hydrogel with ammonium hydroxide, washing the treated hydrogel with water, soaking the washed hydrogel in an aqueous solution of a silver compound wherein the silver is present as a cation, washing the soaked hydrogel with water to remove excess silver solution, drying and calcining the soaked hydrogel.

6. A method of hydrocracking a heavy hydrocarbon oil which comprises contacting said oil in the presence of hydrogen under hydrocracking conditions with a catalyst comprising from about 2% to 15% silver intimately associated with silica-alumina, said silver being incorporated into the silica-alumina by ion-exchange of silver cations into a silica-alumina hydrogel substantially free from sodium ions.

7. The method of claim 6 wherein from about 0.1% to 3% by weight fluorine is incorporated in the catalyst.

8. The method of claim 6 wherein the hydrogel has been treated with ammonium hydroxide prior to ion-exchange with the silver cations.

9. A method of hydrocracking a heavy hydrocarbon oil which comprises contacting said oil at a temperature in the range from about 500° to 850° F., a pressure in the range from 500 to 3000 p.s.i.g., a liquid hourly space velocity of 0.1 to 10 and a hydrogen to oil mole ratio in the range of about 5 to 50, with a catalyst comprising from about 2% to 15% by weight silver intimately associated with silica alumina, said silver being incorporated into the silica-alumina by ion-exchange of silver cations into a silica-alumina hydrogel substantially free from sodium ions.

10. The method of claim 9 wherein from about 0.1% to 3% by weight fluorine is incorporated in the catalyst.

11. The method of claim 9 wherein the hydrogel has been treated with ammonium hydroxide prior to ion-exchange with the silver cations.

12. A catalyst suitable for hydrocracking hydrocarbon oils which comprises from about 0.1 to 20% by weight silver intimately associated with an acid-acting refractory oxide support, said catalyst having been formed by contacting a hydrogel of said refractory oxide substantially free from sodium with an aqueous solution of a silver compound wherein the silver is present as a cation and calcining the contacted hydrogel.

13. The catalyst of claim 12 wherein fluoride is incorporated into the hydrogel.

14. A method of hydrocracking a heavy hydrocarbon oil which comprises contacting said oil in the presence of hydrogen under hydrocracking conditions with a catalyst comprising from about 0.1% to 20% by weight silver intimately associated wtih an acid-acting refractory oxide, said silver being incorporated into the refractory oxide by ion-exchange of silver cations into a hydrogel of the acid-acting refractory oxide substantially free from sodium.

15. The method according to claim 14 wherein the hydrocracking is effected at a temperature in the range from about 500° to 850° F., a pressure in the range from about 500 to 3000 p.s.i.g., a liquid hourly space velocity of 0.1 to 10, and a hydrogen to oil mole ratio in the range of about 5 to 50.

References Cited by the Examiner
UNITED STATES PATENTS

| | | | |
|---|---|---|---|
| 1,876,009 | 9/1932 | Krauch et al. | 208—112 |
| 2,271,319 | 1/1942 | Thomas et al. | 208—120 |
| 2,926,130 | 2/1960 | Hogan | 208—110 |
| 2,961,414 | 11/1960 | Burton et al. | 212—455 |
| 2,971,903 | 2/1961 | Kimberlin et al. | 208—119 |
| 3,073,777 | 1/1963 | Oettinger et al. | 208—111 |

DELBERT E. GANTZ, *Primary Examiner.*

ALPHONSO D. SULLIVAN, *Examiner.*